United States Patent

Hirt et al.

[15] 3,707,644

[45] Dec. 26, 1972

[54] APPARATUS FOR HEATING GASES TO HIGH TEMPERATURES

[72] Inventors: Thomas J. Hirt; Richard D. Kissinger; John P. Kendall; Karl H. Frantzen, all of Omaha, Nebr.

[73] Assignee: Northern Natural Gas Company, Omaha, Nebr.

[22] Filed: Feb. 19, 1971

[21] Appl. No.: 116,893

[52] U.S. Cl. .................. 313/231, 219/75, 219/121 P, 315/111
[51] Int. Cl. ........................ H01j 17/26, B23k 9/00
[58] Field of Search ...313/231; 315/111; 219/75, 76, 219/121 P

[56] References Cited

UNITED STATES PATENTS

| | | |
|---|---|---|
| 3,042,830 | 7/1962 | Orbach ..................... 313/231 UX |
| 3,004,137 | 10/1961 | Karlovitz ............................ 219/75 |
| 3,297,899 | 1/1967 | Pratt et al. ......................... 313/231 |
| 3,351,799 | 11/1967 | Winkler et al. ..................... 313/231 |
| 3,373,306 | 3/1968 | Karlovitz ........................... 313/231 |
| 3,376,468 | 4/1968 | Hirt et al. ....................... 313/231 X |
| 3,597,650 | 8/1971 | Anderson ...................... 313/231 X |

*Primary Examiner*—Alfred L. Brody
*Attorney*—Merriam, Marshall, Shapiro & Klose

[57] ABSTRACT

Improved apparatus for heating gases to high temperatures without a flame produced by chemical combustion, including a pair of electrodes positioned in the gas stream, means for creating a distributed discharge through the gas stream between the electrodes, including the addition of an ionizing additive to the gas stream, and means providing a pressure differential zone adjacent the upstream electrode to form a recirculation of a portion of the ionized additives about the upstream electrode. The improved apparatus is especially advantageous in a process for titanium dioxide by heating oxygen, as well as other applications where the normal combustion would provide undesirable products during processing.

5 Claims, 3 Drawing Figures

PATENTED DEC 26 1972

3,707,644

INVENTORS
THOMAS J. HIRT
RICHARD D. KISSINGER
JOHN P. KENDALL
KARL H. FRANTZEN

BY *Merriam, Marshall, Shapiro & Klose*
ATTORNEYS

APPARATUS FOR HEATING GASES TO HIGH TEMPERATURES

This invention relates to the heating of gases to high temperatures, and in particular to methods and apparatus for applying a uniformly distributed electrical discharge to a gas stream wherein the stream is heated to extremely high temperatures by the electrical discharge without dependance on a flame produced by chemical combustion.

The ability to heat gases to high temperatures without dependance on a flame produced by chemical combustion is especially advantageous in applications where the normal combustion would provide undesirable products or mixtures with respect to the desired end product. For instance, in a process for titanium dioxide by heating oxygen the basic reaction involved is:

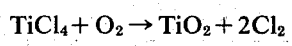

$$TiCl_4 + O_2 \rightarrow TiO_2 + 2Cl_2$$

The presence of any appreciable amount of hydrogen as a normal product of combustion could not be tolerated because of its reactivity with chlorine, which forms hydrogen chloride, a highly corrosive substance.

In B. Karlovitz U.S. Pat. No. 3,004,137, there is described and claimed an electrically augumented flame in which an electrical discharge is distributed throughout a flame created by chemical combustion and thereby heat derived from the electrical energy is added to the heat produced by the chemical combustion. Karlovitz describes the addition of an ionizing additive to the gas stream to obtain an enhanced electrically conductive medium upon which an electrical discharge can be readily imposed. Thus, in effect, the ionizing additive conditions the gas stream to readily support a discharge distributed through the gas stream.

Such an electrically augumented flame produces useful results. For example, electrical power supply problems are reduced because large amounts of power can be supplied at conveniently high voltages. Since relatively low currents may be employed, construction and maintenance of electrodes are greatly simplified and problems due to electrode consumption are reduced. Substantially uniform temperature is maintained throughout the entire flame and temperatures can be obtained with ordinary fuels which otherwise can be obtained only with high cost fuels such as acetylene, cyanogen, etc.

The term "distributed discharge" denotes a type of electrical discharge which is distributed more or less uniformly through a flame as taught by the previously mentioned Karlovitz '137 patent.

In B. Karlovitz U.S. Pat. No. 3,373,306, assigned to the assignee of this application, there are described improvements in methods and apparatus disclosed in said '137 patent in which the flame is pre-ionized prior to the application of electrical discharge whereby the electrical conductivity of the flame can be increased and more precisely controlled. In effect, the flame is divided into two zones. The first zone is maintained at a high temperature (in the order of 3000° K.) and ionizing additives are introduced into this hot zone. Hot gases containing additives ionized at the high temperature flow from the first zone into the second zone in a highly turbulent state. Because of the turbulence and the high conductivity of the gases a distributed electrical discharge may be maintained through the gases in the second zone. Only a small portion of the volume of gas to be heated is supplied to the first zone, the major portion being supplied directly into the second zone.

In T. J. Hirt et al. U. S. Pat. No. 3,376,468 there are described improvements in method and apparatus disclosed in U. S. Pat. No. 3,373,306, wherein a plasma torch utilizing an electric arc is used to heat the gases to a desired temperature in a pre-ionizing zone to which ionizing additives are added and the heating gases containing ionized additives are projected in the form of a jet into a turbulent chamber. A high voltage is maintained across the chamber and a uniformly distributed electrical discharge is maintained through the gases because of the high degree of turbulence of the gases in the chamber and the high electrical conductivity of the gases. Only a relatively small portion of the gases to be heated is introduced into the electric arc. The major portion of the gases to be heated are introduced into the turbulence chamber through a pourous wall causing the gas to transpire into the turbulence chamber and reducing thermal shock and heat losses at the walls of the chamber.

While such previously mentioned electrically augmented burners when operated using a flame produced by chemical combustion have attained high gas temperatures, they did not maintain the level of ionization required as defined herein when operation without chemical combustion is desired.

SUMMARY OF THE INVENTION

In accordance with the principles of the present invention, extremely efficient pre-ionization is provided such that a one-stage electrically augmented burner can be operated in a distributed discharge mode without chemical combustion. This extreme efficiency in accordance with the present invention is provided by a combination of factors, including improved burner apparatus: (1) providing a recirculation of gases in a zone near the upstream orifice and the upstream electrode; and (2) insuring the recombination time of electrons and ions in the gas stream is long enough so that the discharge will be self-sustaining with an A.C. power supply. If desired, a direct current source may be used since the ion-electron recombination time is not a problem. The improved burner structure includes a gas inlet in the vicinity of the upstream electrode to develop a pressure differential zone about the top and side portions of the electrode, thus aiding the recirculation of gases containing ionized material near the upstream electrode orifice. The efficient one-stage burner of the present invention therefore eliminates the previously required additional pre-heating and pre-ionization stage with chemical combustion and/or electric arcs of the prior art.

In operating a burner constructed in accordance with the invention, a pilot flame with chemical combustion was used in start-up, and almost immediately thereafter the burner was operated in the diffuse discharge mode without a flame produced by chemical combustion.

DETAILED DESCRIPTION

Figure 1:
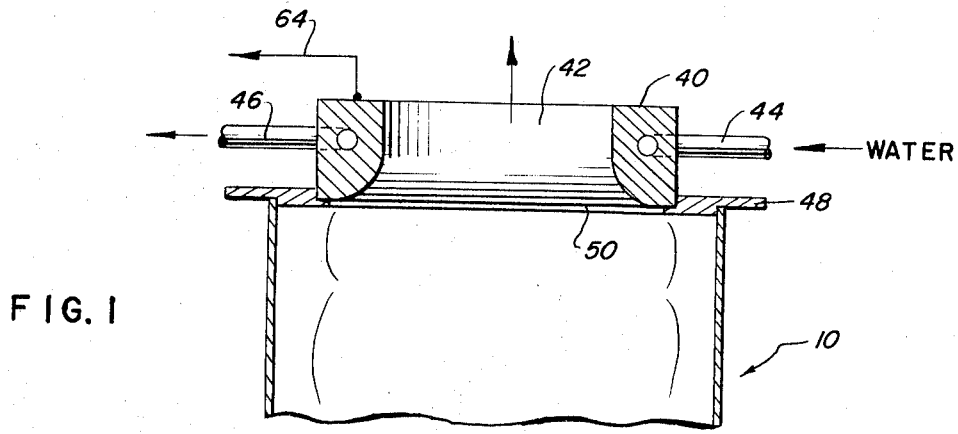
FIG. 1 is a cross-sectional elevational view illustrating the apparatus constructed in accordance with the principles of the present invention.
Figure 2:
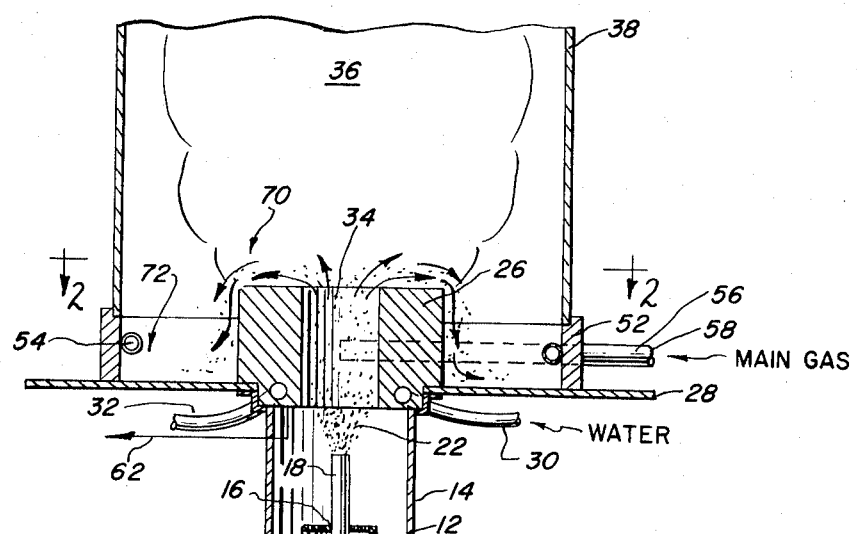
FIG. 2 is a cross-sectional plan view taken along section lines 2—2 as shown in FIG. 1, and illustrating the construction details for the tangential air inlet.
Figure 2:
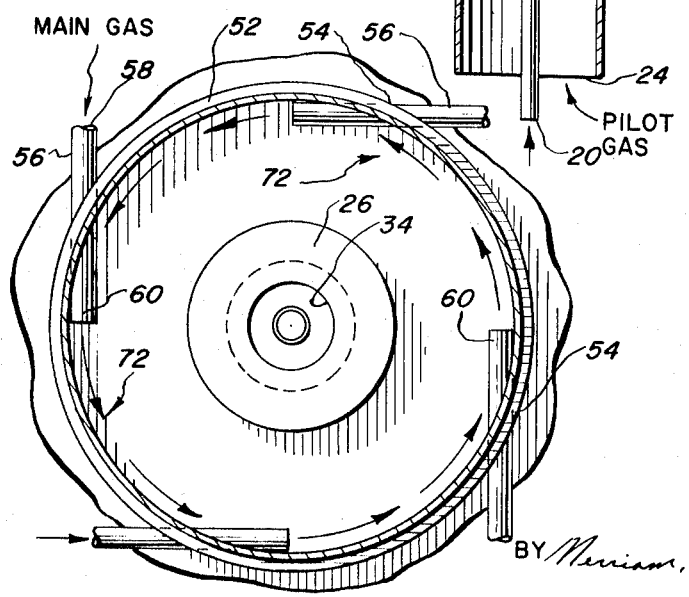

Referring to FIGS. 1 and 2, there is illustrated the construction of a non-combustion gas heater representing an actual operating unit constructed and operated in accordance with the principles of the present invention.

FIG. 1 illustrates a burner 10 in accordance with the present invention and including a pilot flame holder 12 supported within a pilot combustion tube 14. The pilot flame holder 12 is formed with a passageway 16 therethrough to accommodate an additive tube 18 having an inlet 20 for supplying a powdered ionizing additive 22 as will be more particularly described hereinafter. An inlet passageway 24 is provided at one end of the pilot combustion tube 14 to provide an inlet for piloting gas to be supplied to the flame holder 12.

At the other end of the pilot combustion tube 14 there is located a water cooled electrode 26 suitably mounted to an insulating support end plate 28. Electrode 26 is cooled by any suitable means, such as the illustrated water cooling means provided by coupling a water supply to water inlet 30 for circulation of water through the electrode 26 and exiting through water outlet 32.

Electrode 26 includes an orifice 34 for passage of the gas supply through inlet 24 and the ionizing additive through inlet 20 into a diffuse discharge zone 36 bounded by the upstream electrode 26, insulating tube 38 and downstream electrode 40. Downstream electrode 40 similarly includes an orifice 42 somewhat larger than the orifice 34 of the upstream electrode. Satisfactory burner operation in accordance with the present invention has also been obtained with both orifices of approximately equal size. Downstream electrode 40 similarly includes cooling means, such as water, coupled to the water inlet tube 44 for recirculation through the electrode and exiting from the electrode via outlet tube 46. An end plate 48 containing an orifice 50 is mounted at one end of the tube 38 for supporting the electrode 40. Suitable adjustable clamping means as shown in the above mentioned Karlovitz and Hirt et al. patents can be used to clamp the end plates in position.

The upstream end of tube 38 is supported by flange 52 mounted atop end plate 28, the flange 52 containing a series of inlets 54 equally based around the perimeter of the flange. Mounted within each of the passageways 54 is a tube 56 each having an inlet 58 for conveying the main gas stream supplied thereto into the interior of the flange 52. The outlet end 60 of each of the tubes 56 extends substantially tangential to the inner perimeter of the flange 52 so that the main gas stream is supplied in a tangential flow around electrode 26 and into the diffuse discharge zone 36.

A lead 62 connects the upstream electrode 26 to one end of a high voltage power source and lead 64 connected to the downstream electrode 40 is connected to the other end of the high voltage power source.

The structural details and the operational characteristics of the present invention in order to operate the apparatus shown in FIGS. 1 and 2 in a diffuse or distributed discharge mode as a single stage burner without chemical combustion will now be set forth.

As disclosed in the Hirt et al. U. S. Pat. No. 3,465,115 mentioned hereinabove, in order to distribute a powerful electrical discharge in a highly diffused state through a stream of gas and to avoid the formation of arcs or filamentary discharges, it is preferable that the stream of gas have certain physical characteristics prior to the application of the discharge. First, the gas should have a controlled degree of electrical conductivity. This condition is obtained by supplying ionizing additives to the gas, for example, powdered potassium chloride or other material having a low ionization potential and by heating the gas to a temperature at which the ionizing additives are vaporized and ionized.

Second, the gases should have a high degree of turbulence so as to obtain uniform distribution of the ionized additives through the gases.

Third, the gases preferably should be heated to a temperature at which the temperature coefficient of the electrical conductivity approaches zero. That is, the electrical conductivity of the gases will not rise by more than a factor of 2 upon an increase in temperature of 1000° K. This condition is more important when operating the burner with a direct current power supply. When operating with a low frequency single phase alternating current supply, such as 60 Hertz, there is not produced a time uniform heating of the burner gases and hence a self-limiting effect is introduced in the thermal ionization of the additive.

As noted before, the aforementioned Karlovitz U. S. Pat. No. 3,373,306 describes apparatus and a method for operating a burner in which effective pre-ionization can be obtained by introducing the ionizing additive into a high temperature piloting region or zone of a gaseous flame, and dispersing the formed ions and electrons from that region into the entire flame. As indicated there, the piloting region or zone can be a volume filled with high temperature gas formed either by recirculating eddies, by burning a separate pilot region, or by providing an electric arc discharging between electrodes positioned within the region. In one embodiment shown in FIGS. 8 and 9 of the Karlovitz patent, there is described a burner with improved ionization efficiency in which gaseous streams are heated without a flame produced by chemical combustion, and wherein the piloting region is formed by an electric arc discharging between a casing and a three phase electrode configuration, the ionizing additives being fed into a jet stream eminating from the arc heated piloting zone.

It has now been found that in accordance with the principles of the present invention the improved burner illustrated in FIGS. 1 and 2 can be operated in the diffuse discharge mode as a single stage burner without a flame produced by chemical combustion.

When the burner 10 shown in FIGS. 1 and 2 is operated as a one stage burner without a flame produced by chemical combustion, there is some difficulty in identifying the additive pre-conditioning or piloting zone required to pre-ionize the additive so that a diffuse discharge can be maintained. There is apparently at least two conditions present in the structure and operation of the burner 10 which has allowed such a diffuse discharge to be formed and maintained. In particular, it has been found that with proper operating conditions with respect to the recombination time of the ions and electrons in the gas stream and by providing a recirculation effect in the burner correlated thereto, the burner can be operated without combustion.

Examination of the flow patterns within a burner constructed in accordance with the present invention shows that there is a recirculation of a portion of gases from discharge zone 36 to a recirculation zone immediately surrounding upstream electrode 26. For convenience, this recirculation zone is indicated by the swirl lines and arrows in FIG. 1 and is noted generally by the reference numeral 70.

This recirculation is caused partly by the turbulence eddies which are present on the downstream side of any orifice and is particularly aided by the high velocity main air inlet supplied through inlet tubes 56 tangentially through outlet end 60 into the interior of the flange 52 causing a centrifugal swirl and a low pressure zone 72 bounding the electrode 26 and extending into the diffuse discharge zone 36. The high velocity tangential air flow along the inner perimeter of flange 52 provides a resultant lowered pressure in the zone 72 and thereby induces a recirculation pattern of gases on top of and immediately adjacent the sides of the upstream electrode 26. Thus, this pressure differential zone portion of the burner 10 serves as a highly efficient conductivity region of ionized material around the upstream electrode.

However, in order for this recirculation to be of benefit, the ionized condition of the additive must be maintained for a sufficient length of time so that the discharge will be able to restart after each half cycle of the alternating current power input. That is, the recombination time of the ions and electrons in the gas stream should be less than the time between the half cycle voltage swing when using an alternating current power source. For example, if a 60 Hertz alternating current power supply is used, the recombination times of ions and electrons should be less than 1/120th second.

The processes of concern are as follows:

$$KCl \rightleftharpoons K\cdot + Cl\cdot \quad (1)$$

$$K\cdot \rightleftharpoons K^+ + e^- \quad (2)$$

$$e^- + Cl\cdot \rightleftharpoons Cl^- \quad (3)$$

$$KCl \rightleftharpoons K^+ + Cl^- \quad (4)$$

$$e^- + M \rightleftharpoons M^- \quad (5)$$

$$M^- + K^+ \rightleftharpoons K\cdot + M \quad (6)$$

(Where M is a Neutral Body)

The temperature at which the recombination is occurring is assumed to be 2500° K as the discharge is initiated with combustion as will later be detailed.

Since the KCl is mainly dissociated into its atomic components and we are only interested in the thermal ionization of potassium, (eq 1 & 2) the parts per million concentration is calculated as 3.51. However, this assumes perfect mixing and, by design, this is not present in the device. Using the existing burner conditions and the Saha equation, a value of 74.4 percent is obtained for the extent of thermal ionization of potassium.

Since $Cl^-$ has an electron affinity of 83,300cal/g mole ion (3.61 ev) it would be completely dissociated to give $Cl\cdot + e^-$. The ionization potential of Cl is 13 ev causing no concern at this time.

These figures assume thermal equilibrium. The electron affinities for other species possibly present are given below.

$$O^- = 33.8 \text{ KCal/g mole}$$

$$O^-_2 = 10.1 \text{ KCal/g mole}$$

$$O^-_3 = 45 \text{ KCal/g mole}$$

$$O = 312.37 \text{ KCal/g mole}$$

$$O_2 = 288.16 \text{ KCal/g mole}$$

$$NO = 21 \text{ KCal/g mole}$$

$$NO_2 = 92 \text{ KCal/g mole}$$

Therefore, we can say in an equilibrated system, O & N will not be effective at 2500° K and the partial pressure of electrons in our system should be $0.744 \times 3.78 \times 10^{-5}$ atmosphere as contributed from the potassium. This can be converted to electrons per cc by the following relationship:

$$M/V = (2.81 \times 10^{-5}/2500 \times 82) = 1.37 \times 10^{-10} \text{ or}$$

$$6.023 \times 10^{23} \times 1.37 \times 10^{-10} = 8.25 \times 10^{13} \text{ electrons/cc}$$

The problem now is concerned with the time required to reduce the electron concentration to a point where the conductivity is too low to allow sufficient energy input into the gas without arcing. This should amount to $4 \times 10^{13}$ electrons/cc, which is obtained from earlier theoretical considerations given in U. S. Pat. No. 3,004,137.

Taking a simplified approach, we can say the rate of recombination is $$dN/-dt = p N^2$$

Where
  $p$ = recombination coefficient
  $N$ = concentration
Rearranging and integrating $$dN/-N^2 = p \, dt$$

$$-\int_{N_1}^{N_2} \frac{dN}{N^2} = p \int_0^{t_2} dt$$

$$-1/(N_2 - N_1) = p(t_2)$$

The recombination of ions in their own gas, such as $O^- + O^+ \rightarrow O_2$ atmosphere, usually have recombination coefficients of approximately $1 \times 10^{-6}$ cm$^3$/sec (p). Another example would be $K^+ \times Cl^- \rightarrow KCl$ which would be appropriate for our experimental conditions. Numerical values substituted into the above equation yields $$-1/(4 \times 10^{13} - 8 \times 10^{13}) = 1 \times 10^{-6} (t)$$

$$t = 2.5 \times 10^{-8} \text{ sec}$$

Thus, if both atoms existed as ions in an atmosphere of KCl vapor, we could expect that 25 nanoseconds would be required for the concentration of ions to decrease to one-half of their original value.

However, the unit is operating in a temperature regime where the Cl⁻ ion is unstable and therefore an additional rate process must be considered. For the sake of argument, the process would be $Cl^- \rightarrow Cl + e^-$. Experimental evidence yields values of the recombination coefficients of $10^{-10}$ cm³/sec for atoms. Since the above rate involves atoms, the coefficient will be in $10^{-10}$ range. Making numerical substitutions into the above equation, we obtain $$1/(4 \times 10^{13}) = 10^{-10} (t)$$

$$t = 2.5 \times 10^{-4} \text{ sec}$$

for the concentration to fall to one-half of its original value. Thus, as in any rate process, it is controlled by the slowest process. Therefore, if the above process describes what occurs in the burner, enough conductivity would reside in the gas (free electrons) so that the next increase in voltage (use of 60 Hertz AC power) would be accompanied with adequate current flow to reheat the gas and raise the conductivity level to the point where maximum power could be imparted without arcing.

It is felt by those skilled in the art that the likely process is

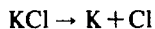

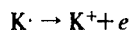

In this event, the only reaction of concern is the ionization step since the residual temperature of the gas between heating cycles does not fall below the point where molecular dissociation would not occur.

Using the value of p for cesium $(4 \times 10^{-13})$ cm³/sec in the proper equation, the following is obtained $$1/(4 \times 10^{13}) = 4 \times 10^{10} (t)$$

$$1/(1.6 \times 10^4) = (t)$$

$$t = 0.625 \times 10^{-4} \text{ sec}$$

This time of recombination is within reason for the concentration of electrons to fall to one-half of its original value and yet be conductive enough for the following power cycle to occur without arcing.

If the recombination rate of various gaseous molecules are considered, measured recombination coefficients of $10^{-7}$ and $10^{-8}$ cm³/sec are found for gases such as $H_2$, $O_2$, and $N_2$. This gives times on the order of $10^{-7}$ seconds for the concentration under consideration to fall to one-half of its value.

Thus, it may be concluded that any gaseous medium can be heated and a diffuse discharge maintained in the absence of combustion, using any suitable alternating current power source provided an alkali metal salt or atom is present in the proper concentration, and proper conditions are provided by the burner apparatus to attain highly efficient preionization. Thus, as an example, suitable 25, 50, 60 or 400 Hertz power supplies may be used.

As an example of a burner constructed and operated in accordance with the present invention, the following constructional details can be given.

1. Orifice of upstream electrode 26 = 0.5 inch
2. Height of upstream electrode 26 from end plate 28 to top of electrode 26 = 1.25 inches
3. Orifice 42 of downstream electrode 40 = 1.75 inches (0.8 inches radius at upstream end)
4. Diameter of tube 38 = 4 inches
5. Length of tube 38 = 24 inches
6. Height of flange 52 = 1 inch
7. Input power to burner = 100–110 KW
8. Operating voltage supplied between electrodes 26 and 40 = 1900–2100 volts, 60 Hertz
9. Additive feed rate through tube 18 = 3–4 grams per hour
10. Air rate, pilot 17 SCFM
11. Air rate, main (tangential) = 45 SCFM Basically the operation of burner 10 is accomplished in three steps:
a. Start pilot flame in flame holder 12;
b. Start ionizing additive in tube 18; and
c. When diffuse discharge begins--shut off combustible fuel supply and increase the non-combustible gas rates.

In operating a burner 10 constructed as described herein the burner was started with a small amount of fuel supplied to the pilot inlet 24 to start a pilot flame with chemical combustion at flame holder 12. Additional pilot air which was oxygen at about one-fourth of the above listed rate was also supplied to inlet 24, and the main air which was again oxygen was also supplied at about one-third of the above listed rate to the tubes 56. Potassium chloride, cesium nitrate, or mixtures thereof, in dry powder form were used as the ionizing additive and were carried by oxygen supplied to the tube 18 inlet 20 at a rate of approximately 1 SCFM. As soon as the main discharge begins in zone 36, the fuel supplied to inlet 24 (in this case methane) was turned off and the pilot and main air (oxygen) flow rates increased to the indicated rates set forth in the above table. The ionizing additive rate required to start the burner is higher than required for continued operation. After the air flows are increased, the additive rate is reduced to that given in the table above.

The burner 10 is now operating in a diffuse discharge mode without a flame produced by chemical combustion. Thus, the unique structural features of the burner as shown in FIG. 1, and in particular the electrode configuration and the tangential flow provides a burner which can utilize the recirculating eddies and the recombination rate phenomenon to an advantage in forming the burner diffuse discharge operation without chemical combustion.

As indicated previously, the advantages of an electrical augmented burner without a flame produced by chemical combustion are many. In particular, such a burner could be used for the formation/decompostiion of particulate matter, the oxidation of materials to form oxides (as titanium dioxide) and the reduction of metal oxides. It must be realized of course that the direct application of the burner of FIG. 1 to any of these applications may require modifications in order to provide the specific desired results, however, the disclosure and teachings herein are sufficient to describe the principle of the invention wherein such a diffuse discharge burner can be operated without combustion.

Figure 3:
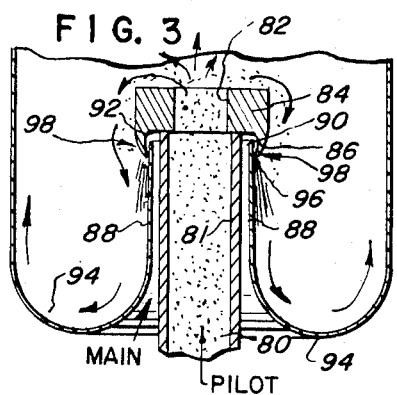
FIG. 3 is an alternative apparatus according to the invention and illustrated in a fragmented cross sectional view.

In FIG. 3 there is illustrated an alternative embodiment to the flange 52 for providing the pressure differential and resulting highly conductive zone of ionized material around the upstream electrode. In the embodiment shown in FIG. 3, a pilot airstream carrying ionizing material as previously described is supplied through the pilot inlet 80 in pilot conduit 81 and passes through orifice 82 in upstream electrode 84. Electrode 84 is provided with an inwardly projecting rim 86 extending around the electrode 84 and downwardly from the bottom thereof towards a contoured deflector 88. The contoured deflector 88 includes a tubular thin walled portion extending adjacent the pilot conduit to an open end 90 at the backside 92 of electrode 84. Deflector 88 further includes a concave bottom portion 94 extending from adjacent the pilot conduit 81 and upwardly towards the downstream portion of the burner.

As can be seen from FIG. 3, the downwardly projecting rim 86 and the end 90 form a restricted opening 96 therebetween. The main air inlet is supplied between deflector 88 and pilot conduit 81, and upstream towards the backside 82 of electrode 84. The main airstream is then deflected from the electrode backside 92, reverses direction, and jets downwardly through the restricted opening 96 towards the concave portion 94. It is to be noted that the high velocity jet stream at the backside 92 of electrode 84 provides a pressure differential zone around electrode 84 as indicated generally by the reference arrow 98 so as to tend to drag ionized material from the top of electrode 84 and downwardly around the sides of the electrode. Thus, a strong back flow of hot, ionized material is provided around electrode 84 resulting in good conductivity to enable the burner operation without a flame produced by chemical combustion. It is to be understood, of course, that the main flow jetted rearwardly in an annular sheath jet from the opening 96 towards the concave portion 94 is deflected upwardly towards the downstream electrode (not shown). Also, the alternative burner electrode and air inlet embodiment of FIG. 3 would be operated within a tubular enclosure such as the insulating tube 38 shown in FIG. 1, with a suitable downstream electrode.

The upstream electrode may also comprise a ring structure, such as a donut like electrode supported by adjustable legs over the upstream electrode orifice. In such a configuration a recirculation pattern is induced around the suspended electrode ring.

The foregoing detailed description has been given for clearness of understanding only, and no unnecessary limitations should be understood therefrom, as modifications will be obvious to those skilled in the art.

What is claimed is:

1. Apparatus for heating gases during operation to high temperatures without a flame produced by chemical combustion, said apparatus comprising:
   a tube for containing a gas stream;
   means for supplying a pilot flame produced by chemical combustion to said tube only during initial start-up of said operation;
   an upstream electrode centrally positioned at one end of said tube and having an orifice for passage of a first portion of said gas stream therethrough;
   a downstream electrode centrally positioned at the other end of said tube;
   means for connecting said upstream and downstream electrodes to a high voltage power supply;
   means for introducing ionizing additives through said orifice into said gas stream for creating a distributed discharge through the gaseous stream between said electrodes;
   gas inlet means adjacent said upstream electrode for entering a second portion of said gas stream into said tube; and
   pressure differential means for providing a pressure differential zone adjacent said upstream electrode to form a recirculation of a portion of said ionizing additives about said upstream electrode.

2. Apparatus as claimed in claim 1, wherein said pressure differential means comprises gas projecting means in said gas inlet means for projecting said second portion of the gas stream tangentially to said tube and causing a centrifugal swirl of said gas stream around said upstream electrode.

3. Apparatus as claimed in claim 2, wherein said gas projecting means and said gas inlet means includes an annular flange surrounding said upstream electrode, at least two gas inlet ports in said flange, and a respective gas conduit passing through each of said inlet ports into the interior of said flange having a discharge end directed substantially tangentially to said flange, thereby lowering the pressure around said upstream electrode relative to one end of said electrode so as to urge said ionizing additives to flow in a recirculating manner around said upstream electrode.

4. Apparatus as claimed in claim 3, wherein said annular flange includes four of said gas inlet ports symmetrically disposed around the perimeter of said flange.

5. Apparatus as claimed in claim 1, including means connected to each of said electrodes for connection to an alternating power source having an alternating frequency greater than the recombination rate of said ionized additive.

* * * * *